United States Patent [19]

McMahon, Jr. et al.

[11] Patent Number: 4,885,327

[45] Date of Patent: Dec. 5, 1989

[54] SWELLED POLYMERIC DECONTAMINATION COMPOSITION

[75] Inventors: William A. McMahon, Jr.; David A. Trujillo; Robert E. Lyle, Jr., all of San Antonio, Tex.

[73] Assignee: Southwest Research Institute, San Antonio, Tex.

[21] Appl. No.: 122,103

[22] Filed: Nov. 18, 1987

[51] Int. Cl.$^4$ ................................................ C08K 5/06
[52] U.S. Cl. .................................... 524/376; 524/401
[58] Field of Search ................................ 524/376, 401

[56] References Cited

U.S. PATENT DOCUMENTS 2,684,321 7/1954 Thurmon et al.
2,721,827 10/1955 Gustus.
2,951,012 8/1960 Gisvold.
3,234,150 2/1966 Feldt et al.
3,922,342 11/1975 Rathbun.

FOREIGN PATENT DOCUMENTS 552083 4/1977 U.S.S.R.
833240 5/1981 U.S.S.R.

Primary Examiner—Joseph L. Schofer
Assistant Examiner—Peter D. Mulcahy
Attorney, Agent, or Firm—Sigalos, Levine & Montgomery

[57] ABSTRACT

A polymeric decontamination composition comprising a polymeric reaction product resulting from the reaction of a polyvinylbenzyl halide and a monomeric amine admixed with an alkali metal hydroxide solution capable of swelling said polymeric reaction product and the method of making the composition.

10 Claims, No Drawings

SWELLED POLYMERIC DECONTAMINATION COMPOSITION

BACKGROUND OF THE INVENTION

This invention was made under U.S. Government Contract No. DAMD-17-83-C-3128 and the United States Government has a non-exclusive, nontransferable, irrevocable, paid-up license to practice or have practiced for or on behalf of the U.S., this invention throughout the world.

The present invention relates to polymeric decontamination compositions intended to counter the effects of toxic chemical agents such as the highly toxic chemical warfare agents known as G-agents which are broadly organic esters of substituted phosphoric acid as well as other toxic phosphorylating agents as are present in certain insecticides.

Such phosphorylating agents are generally colorless and odorless gases and are readily absorbed through the skin and depending on the particular phosphorylating agents can cause reactions in humans and other animals varying from minor neurological disorders such as disorientation to death.

Efforts to combat against such toxic agents includes protective garments, the use of atropine and pralidoxime to neutralize the effects of such agents and reactivate the inhibited enzymes, and chemical neutralizers. At the present time, one of the most effective decontamination compositions is the chemical neutralizer DS2 (diethylenetriamine in a caustic solution). Such solution often also contains methyl cellosolve as a thickener in order to keep the neutralizer in place on the skin of the animal or other surface so that it can act over a long period of time to decontaminate the toxic phosphorylating agent.

However, such decontamination solutions as DS2 are very corrosive to the skin and while adequate for the contamination of surfaces such as on vehicles, they are not suitable for use on the skin of animals and particularly humans.

Efforts to maintain the effectiveness of compounds such as DS2 while eliminating the skin irritation and corrosiveness have not been successful.

SUMMARY OF THE INVENTION

The present invention provides an effective decontamination composition for decontaminating toxic phosphorylating agents which are not toxic to the skin or irritating thereto.

Briefly, the present invention comprises a polymeric decontamination composition comprising the polymeric reaction product resulting from the reaction of a polyvinylbenzyl halide and a monomeric amine, and swollen with an alkali metal hydroxide composition.

The invention also comprises the method of making such composition as more fully set forth hereinafter.

DETAILED DESCRIPTION

The present composition is effective against the toxic phosphorylating agents utilized in chemical warfare agents and in certain insecticides. In terms of the chemical warfare agents involved, they are commonly known as G-agents with examples being TABUN (GA), SARIN (GB), and SOMAN (GD). These particular agents are highly toxic by injection, inhalation, as well as by skin absorption and are fatal on short exposure They are in effect nerve gases that function by inhibiting cholinesterase enzymes and a medical defense against individuals exposed by inhalation to such compounds involves the use of atropine and pralidoxime to neutralize the effects of the compounds and to reactivate the inhibited enzymes.

In the description that follows and in the specific examples the activity of the compositions of the present invention has been tested against diethylchlorophosphate (DECP) since this compound while also a cholinesterase inhibitor and toxic through ingestion, inhalation and skin absorption is not as dangerous and is in liquid form and can be more readily handled for testing purposes It is used and has been used herein as the test vehicle since it simulates the reactivity of the other cholinesterase inhibitors such as the G-agents.

The polymeric decontamination composition of the present invention has as its essential components the polymeric reaction product resulting from the reaction of a polyvinylbenzyl halide and a monomeric amine, and then swollen with an alkali metal hydroxide composition.

As to the polyvinylbenzyl halide, it is preferably a chloride and the monomeric amine is preferably diethylene triamine although other monomeric amines such as ethylene diamine, triethylene tetramine, tetraethylene pentamine, dimethylamine, diethylamine, methylamine, ethylamine, ethanolamine, diethanolamine, and the like can be used.

The polyvinylbenzyl halide is first dissolved in any of the usual solvents therefor such as methylene chloride and the reaction is carried out the ambient temperature and pressure, although more elevated temperatures and pressures can be utilized if desired. While stoichiometric amounts of the two reactants can be utilized, it is preferred to use an excess of the amine. The excess amine is used so that it will react with the HCl formed and result in an amine hydrochloride which is readily removable from the reaction product medium by water. The reaction carried out with agitation until essentially complete. Completion is determined by noting the formation of a thick slurry.

The result is a polymeric reaction product which results from the following reaction:

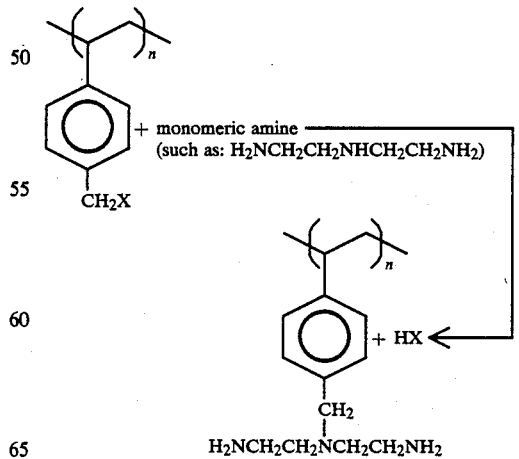

In these formulas, X is a halide and n is an integer of at least 10.

This resulting dried reaction product is then ground to form a fine powder and is then treated with alkali metal hydroxide composition. The hydroxide composition swells the reaction product to form a swollen mass.

The hydroxide composition consists of the alkali metal hydroxide and a swelling agent; the IO hydroxide is preferably sodium hydroxide and swelling agent being any compound or mixture of compounds that can dissolve the hydroxide and be absorbed by the polymer. While any hydroxy polar ether can be used for this purpose methyl cellosolve is preferred although other cellulose ethers, polyethylene glycol and the like meeting the above criteria can be used. The amount of the hydroxide composition added is not important; so long as care is taken not to add an amount to swell the reaction product; ordinarily about 1 to 5 parts by weight for each 100 parts by weight of polymer. The hydroxide composition can contain from about 8 to 15 parts by weight of a hydroxide dissolved in 100 parts by weight of methylcellosolve; preferably 10 parts by weight of hydroxide.

The invention will be further described in connection with the following examples which are set forth for purposes of illustration only.

EXAMPLE 1

Polyvinylbenzyl diethylenetriame was prepared by first forming a solution of 40 g of polyvinylbenzyl chloride in 500 ml of methylene chloride in a reactor kept at ambient temperature and pressure. There was added to the solution 54.1 g of diethylenetriamine in 150 ml of methylene chloride and the resulting reaction mixture stirred at room temperature and pressure for 48 hours at which time the reaction was complete.

Approximately 1,000 ml of methanol was then added to the reaction mixture and the methylene chloride, and some methanol, removed by vacuum evaporation. The approximately 700 to 80 ml of the reaction medium remaining was diluted to 4,000 ml with demineralized water and the solid formed was removed by filtration using a Buchner funnel. The liquid contained the amine hydrochloride salt. The solid was washed once with 500 ml of water and then air dried followed by drying in an oven.

The theoretical yield was 57.5 g and measurement lenetriamine) showed a yield of 54.1 g or 94% of theoretical.

The resulting product was ground to a fine powder and 15 g thereof were added to a solution of 22.6 g of NaOH in 203.7 g of methyl cellosolve. The mixture was agitated for seven days and then the solid filtered off and washed once with about 200 ml of methyl cellosolve.

The result was 45.4 g of swelled polyvinylbenzyl diethylenetriamine.

EXAMPLE 2

The procedure of Example 1 was followed except that ethylene diamine was used instead of diethylene triamine.

More particularly, 13.02 g of polyvinylbenzyl chloride and 100 ml of methylene chloride were placed in a reaction vessel and then 12.2 g of ethylene diamine in 100 ml of methylene chloride added. The reaction was carried out at ambient temperature and pressure for 72 hours with stirring. At the end of that time a thick mass of precipitated reaction product had formed.

To this reaction product there was added 800 ml of ethanol and 1,000 ml of water and the entire mixture was then filtered. The filtered solids were then mixed with 3,000 ml of water and stirred for 30 minutes, filtered, and then dried in an oven at 75° F.

The dried product weighed 15.06 g and was polyvinylbenzyl ethylenediamine.

EXAMPLE 3

18.8 g of polyvinylbenzyl diethylene triamine were added to a solution of 28.4 g of NaOH in 255 g of methyl cellosolve. The mixture was agitated for five days, the solid filtered off, was once washed by slurrying in 200 ml of methyl cellosolve, refiltered, and then blotted dry by pressing between filter paper for about one minute. The swelled product was then tested using the Southwest Research Institute 4-minute test procedure to determine their effectiveness when decomposing diethylchlorophosphate.

The four minute test comprises taking a 200 mg sample of the product to be tested, placing it in a 1-dram vial along with two 6-mm Pyrex glass beads and capping the vial with a polyseal cap. The vial and contents are placed in a 37° C oil bath and allowed to equilibrate to temperature for about 15 to 30 minutes.

Once the temperature has equilibrated, a measured amount of the DECP is added to the sample. The sample with DECP are mixed for 1 minute using vortex mixer to ensure complete contact of DECP and sample. The vial with contents is replaced in the 37° C oil bath for an additional 3 minutes. This exposure time can be extended. 8, 16, 60 and 120 minutes are utilized to determine the effects of time on the decomposition of DECP.

Two milliliters of diethyl ether (Et20) are added to the vial after the sample and DECP have been in contact for the allotted time, and the vial capped.. The heterogeneous mixture is vortexed for 5 seconds and centrifuged for 1 minute. The ether layer is withdrawn to a clean labeled vial via a Pasteur pipette and assayed for DECP content by gas chromatography (GC). The peak height of the DECP from the test sample is compared with the GC peak height of a standard sample. The standard sample is prepared from the same measured amount of DECP which was placed in a vial and is placed in a 37° C oil bath. Two milliliters of diethylether are added and the standard assayed by GC.

The percentage decomposition of the DECP is determined by the ratio of peak heights of the test sample relative to the standard sample. One standard sample and four replicate test samples are prepared and assayed for each evaluation. The standard sample is assayed twice, once before the test samples and once after the test samples to ensure reproducibility of the standard.

The results of the tests over time are shown in Table I set forth below:

TABLE I

| Test Run | Amt. of DCEP | Time | Temp. | % Decomposition of DECP | Deviation |
|---|---|---|---|---|---|
| A | 50 (μL) | 8 | 37° C. | 81.7 | 3.4 |
| B | 50 (μL) | 16 | 37° C. | 91.6 | 2.2 |
| C | 50 (μL) | 60 | 37° C. | 98.4 | 0.0 |
| D | 50 (μL) | 120 | 37° C. | 99.2 | 0.0 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A polymeric decontamination composition consisting essentially of a swelled polymeric reaction product consisting of the reaction product of a polyvinylbenzyl halide and a monomeric amine admixed with an alkali metal hydroxide solution capable of swelling said polymeric reaction product.

2. The composition of claim 1 wherein said halide is a chloride and said amine is diethylene triamine.

3. The composition of claim 2 wherein said alkali metal hydroxide solution consists essentially of about 8 to 15 parts by weight of NaOH dissolved in a hydroxy polar ether.

4. The composition of claim 3 wherein said hydroxy polar ether is methyl cellosolve.

5. The composition of claim 4 wherein said alkali metal hydroxide solution is added in a 1 to parts by weight for each 100 parts by weight of said polymeric reaction product.

6. The method of making a polymeric decontamination composition comprising forming a reaction mixture consisting essentially of a polyvinylbenzyl halide and a monomeric amine, reacting said polyvinylbenzyl halide with said monomeric amine to form a polymeric reaction product, admixing said reaction product with an alkali metal hydroxide solution capable of swelling said reaction product in an amount and for a time sufficient to swell said reaction product.

7. The method of claim 6 wherein said halide is a chloride and said amine is diethylene triamine.

8. The method of claim 7 wherein said alkali metal hydroxide solution consists essentially of about 8 to 15 parts by weight of NaOH dissolved in a hydroxy polar ether.

9. The method of claim 8 wherein about 1 to 5 parts by weight of said alkali metal hydroxide solution is admixed with each 100 parts by weight of said polymeric reaction product 10. The method of any one of claims 6 to 9 wherein the polyvinylbenzyl halide is reacted with an amount of monomeric amine in excess of that required to react with said halide.

* * * * *

UNITED STATES PATENT AND TRADEMARK OFFICE
CERTIFICATE OF CORRECTION

PATENT NO. : 4,885,327
DATED : December 5, 1989
INVENTOR(S) : McMahon, Jr. et al.

It is certified that error appears in the above-identified patent and that said Letters Patent is hereby corrected as shown below:

Column 2, line 13, after the word "purposes" insert --.--.

Column 3, line 6, after the word the, delete "10".

Column 3, line 46, after the word "measurement" insert --of the final product (polyvinylbenzyl diethy--.

Column 4, line 34, delete "(Et20) and insert --(Et$_2$0)--.

Column 5, line 22, after the word "to" insert --5--.

Signed and Sealed this

Eleventh Day of December, 1990

Attest:

HARRY F. MANBECK, JR.

*Attesting Officer*   *Commissioner of Patents and Trademarks*